US006799356B2

(12) United States Patent
Sanchez

(10) Patent No.: US 6,799,356 B2
(45) Date of Patent: Oct. 5, 2004

(54) SCREW/INSERT SAVER

(76) Inventor: Javier Sanchez, 28 W. Floral Ave., Arcadia, CA (US) 91006

( * ) Notice: Subject to any disclaimer, the term of this patent is extended or adjusted under 35 U.S.C. 154(b) by 86 days.

(21) Appl. No.: 10/355,733

(22) Filed: Jan. 31, 2003

(65) Prior Publication Data

US 2004/0151554 A1 Aug. 5, 2004

(51) Int. Cl.⁷ ................................................. B23C 9/00
(52) U.S. Cl. .................. 29/284; 409/134; 408/241 R; 82/173; 29/DIG. 79; 29/DIG. 94; 83/701; 72/483; 30/1; 451/559; 248/318; 248/693; 248/206.5; 248/229.13; 248/229.15; 248/229.16; 248/160; 220/483
(58) Field of Search ................................ 248/104, 318, 248/693, 324, 276.1, 206.5, 235, 229.13, 229.15, 229.16, 160; 409/137, 134; 408/241 R; 82/173; 29/DIG. 53, DIG. 61, DIG. 79, DIG. 94, DIG. 102, 284; 83/701; 72/483; 30/1; 451/559; 220/483

(56) References Cited

U.S. PATENT DOCUMENTS

| 687,931 | A | | 12/1901 | Barr | |
|---|---|---|---|---|---|
| 1,224,431 | A | * | 5/1917 | Van Vorst | 248/229.1 |
| 1,786,459 | A | * | 12/1930 | Simons | 248/104 |
| 1,828,791 | A | | 10/1931 | Thompson | |
| 2,529,567 | A | * | 11/1950 | Neck | 248/693 |
| 2,558,414 | A | | 6/1951 | Blackman | |
| 2,826,386 | A | * | 3/1958 | Conrad | 248/104 |
| 3,220,037 | A | | 11/1965 | Ruhling | |
| 3,876,124 | A | | 4/1975 | Avery | |
| 4,169,331 | A | | 10/1979 | Baker | |
| 4,251,938 | A | | 2/1981 | Goldman et al. | |
| 4,351,073 | A | | 9/1982 | Elsas | |
| 4,569,498 | A | * | 2/1986 | Ermanski | 248/441.1 |
| 4,842,174 | A | * | 6/1989 | Sheppard et al. | 224/548 |
| 4,965,708 | A | * | 10/1990 | Louis | 362/398 |
| 5,032,015 | A | * | 7/1991 | Christianson | 359/512 |
| 5,033,528 | A | * | 7/1991 | Volcani | 248/126 |
| D323,582 | S | * | 2/1992 | Volcani | D3/5 |
| 5,135,189 | A | * | 8/1992 | Ghazizadeh | 248/104 |
| 5,173,181 | A | | 12/1992 | McFarland | |
| D354,038 | S | * | 1/1995 | Redhawk | D12/191 |
| 5,398,176 | A | * | 3/1995 | Ahuja | 248/276.1 |
| 5,419,613 | A | * | 5/1995 | Wedeking | 248/160 |
| 5,639,052 | A | | 6/1997 | Sauve | |
| 5,762,306 | A | * | 6/1998 | Day | 248/274.1 |
| 5,853,158 | A | * | 12/1998 | Riggle | 248/311.2 |
| 5,896,880 | A | * | 4/1999 | Bushweller et al. | 135/16 |
| 6,106,203 | A | * | 8/2000 | Asmis et al. | 409/137 |
| 6,142,486 | A | * | 11/2000 | Cedarberg, III | 248/160 |
| 6,173,725 | B1 | * | 1/2001 | Garth | 248/160 |
| 6,206,464 | B1 | * | 3/2001 | Santa Rosa et al. | 248/160 |
| 6,315,252 | B1 | * | 11/2001 | Schultz | 248/160 |
| 6,322,028 | B1 | * | 11/2001 | Fleckenstein | 248/210 |
| 6,357,710 | B1 | * | 3/2002 | Fielden et al. | 248/276.1 |
| 6,454,233 | B1 | | 9/2002 | Adams | |
| 6,520,495 | B1 | * | 2/2003 | La Mendola | 248/229.13 |
| 6,712,106 | B1 | * | 3/2004 | Wang | 409/137 |
| 6,736,360 | B1 | * | 5/2004 | Buczek | 248/276.1 |

* cited by examiner

Primary Examiner—Erica Cadugan
(74) Attorney, Agent, or Firm—Joseph E. Mueth

(57) ABSTRACT

A machine having a machine tool operatively connected thereto by manually manipulatable fastening members. A fastening member receiving and retaining device is adapted for placement beneath the machine tool for catching fastening members when inadvertently dropped. A device for temporary attachment to the machine or machine adjacent surface, and a flexible cable device are provided for connecting the fastening member receiving and retaining device to the for temporary attachment. The flexible cable device is adapted to be manually positioned and shaped and to retain its shape and position in a self-sustaining manner while holding the fastening member receiving and retaining device beneath the machine tool.

10 Claims, 3 Drawing Sheets

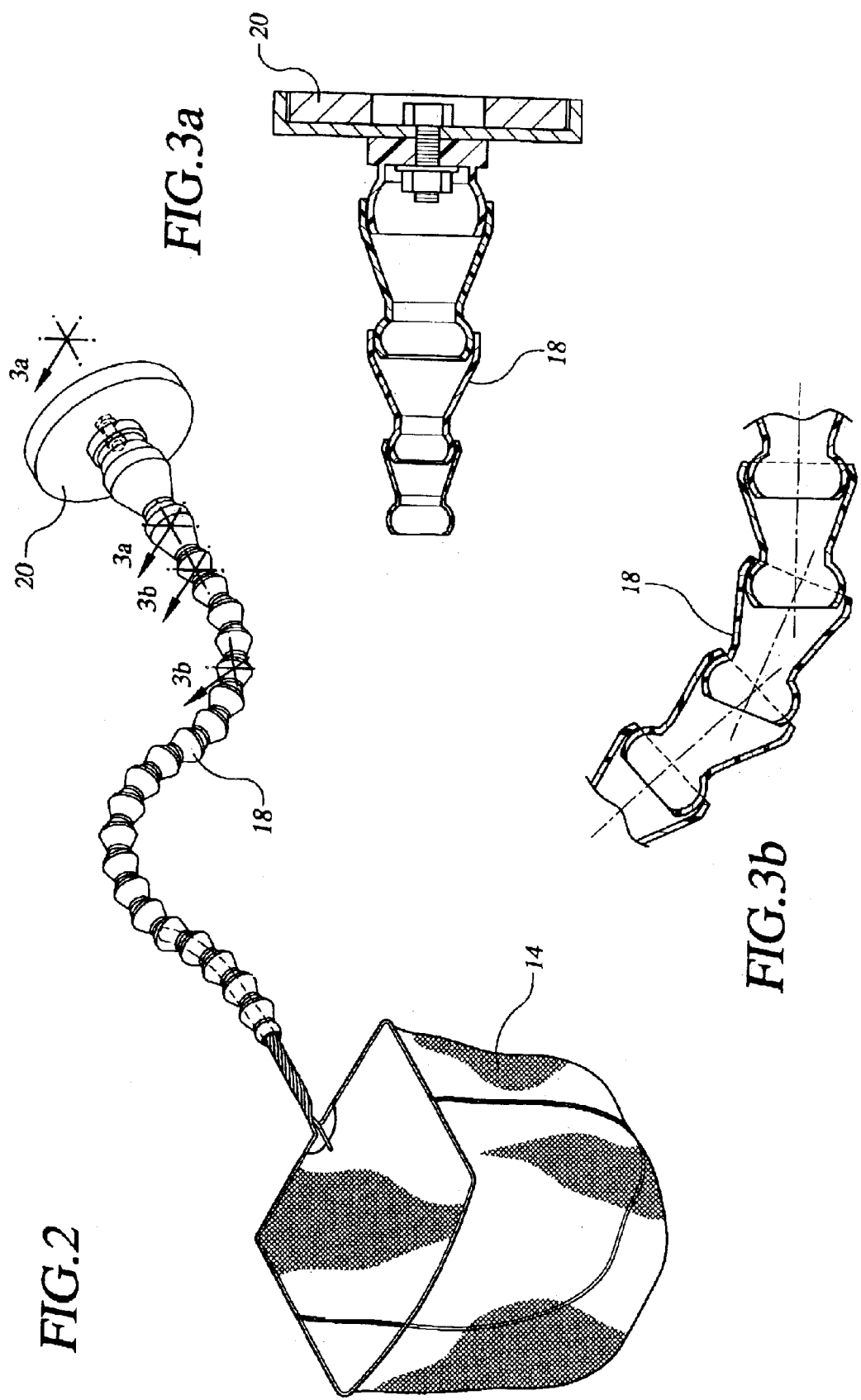

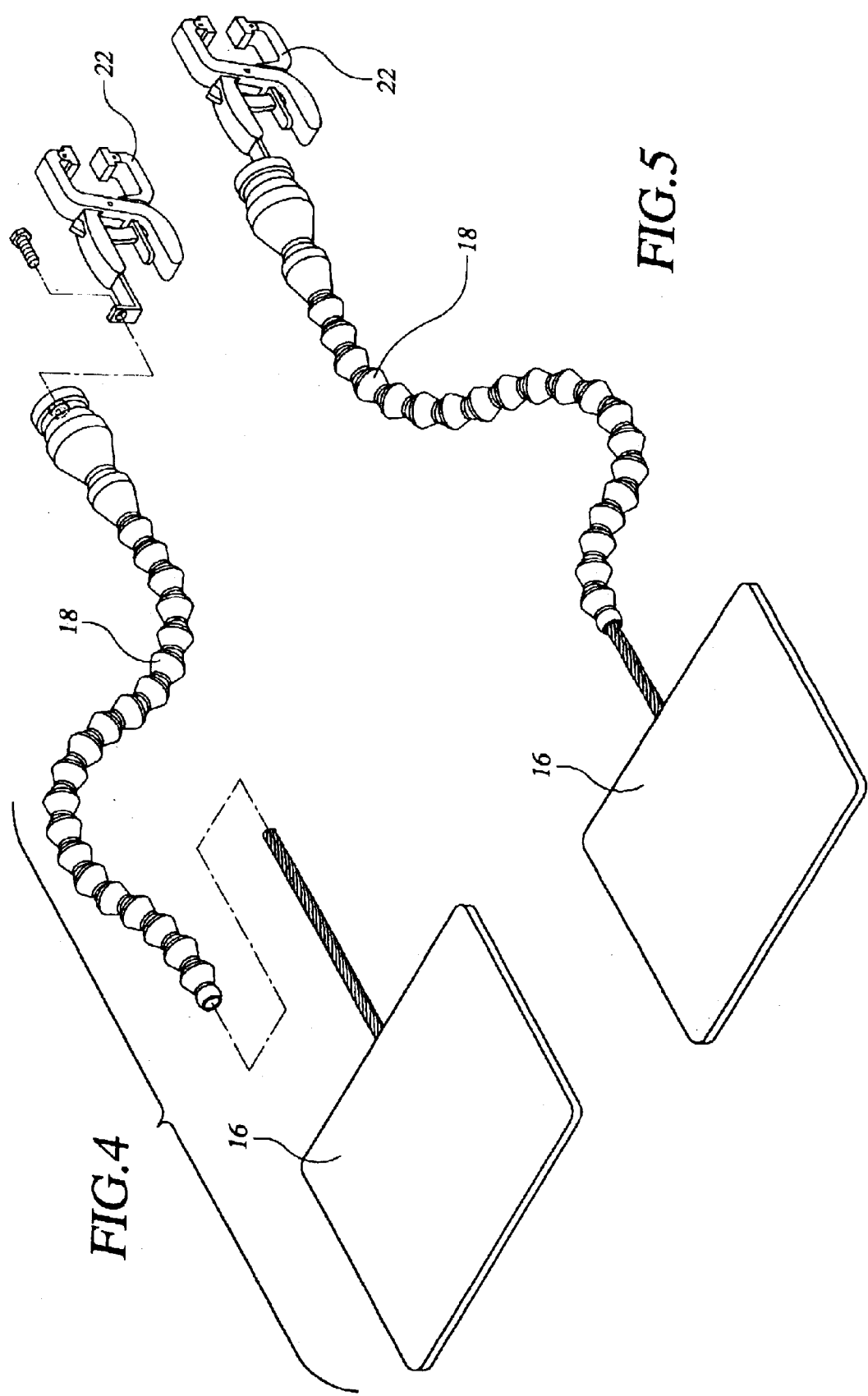

SCREW/INSERT SAVER

BACKGROUND OF INVENTION

In machine shops and the like, lathes and other metal working and materials forming equipment are equipped with tools for cutting, shaping and forming. These tools are subject to wear and tear over time and require fairly frequent changing for repair and reconditioning. The tools are also changed to suit the particular job at hand. The tools are joined or attached to the machine by fasteners such as screws.

The tool changes are required to be performed frequently in many shops, particularly those having many machines.

These fastening devices are usually fairly small and have acquired a coating of oil, grease and dirt making the required manual handling of the fastening devices an uncertain business. If a machine operator in attempting to manipulate the fastening devices in order to make a change of tool inadvertently drops the fastening device, he has to stop working at the task of tool changing in and attempt find the fastening device on the floor or perhaps retrieve it from under a machine. The fastening device then has to be cleaned before it can be used to re-attach or change the tool.

SUMMARY OF INVENTION

Briefly, the present invention comprehends a system for facilitating the changing of tools on machines comprising:

(1) a machine, (2) a machine tool operatively connected to said machine by manually manipulatable fastening means, (3) a fastening means receiving and retaining device adapted for placement beneath said machine tool for catching and retaining said fastening means when inadvertently dropped, (4) means for temporary attachment to said machine or machine adjacent surface, and (5) flexible means for connecting said fastening means receiving and retaining device to said means for temporary attachment, said flexible means being adapted to be manually positioned and shaped and to retain its shape and position in a self-sustaining manner while holding said fastening means receiving and retaining device beneath said machine tool.

The invention also includes a structure for facilitating the changing of tools on machines comprising:

(1) a machine, (2) a machine tool operatively connected to said machine by manually manipulatable fastening means, (3) a fastening means receiving and retaining device positioned beneath said machine tool for catching and retaining said fastening means when inadvertently dropped, (4) means for temporary attachment attached to said machine or machine adjacent surface, and (5) flexible means connecting said fastening means receiving and retaining device to said means for temporary attachment, said flexible means being adapted to be manually positioned and shaped and to retain its shape and position in a self-sustaining manner, said flexible means holding said fastening means receiving and retaining device beneath said machine tool.

An apparatus for catching and retaining manually manipulatable fastener means when inadvertently dropped comprising:

(1) a fastening means receiving and retaining device adapted for placement in proximity to a point of manual manipulation, of fastening means, (2) means for temporary attachment adapted to attach to a surface said fastening means receiving and retaining device;

(3) flexible means connecting said fastening means receiving and retaining device to said means for temporary attachment, said flexible means being adapted to be manually positioned and shaped and to retain its shape and position in a self-sustaining manner while holding said fastening means receiving and retaining device in proximity to said point.

DESCRIPTION OF PREFERRED EMBODIMENT

Turning to the drawings:

FIG. 1 is a perspective view showing a machine with a machine tool held by screws having a fastening means receiving and retaining device, in this case an open pouch, positioned beneath the machine tool and carried by one end of a cable, the other end of the cable being provided with a means for temporary attachment, in this embodiment, a magnet for magnetic attachment to the machine or machine adjacent surface.

FIG. 2 is a perspective view of the pouch, cable and magnet.

FIG. 3a is a sectional view taken along the line 3a—3a in FIG. 2.

FIG. 3b is a sectional view taken along the line 3b—3b in FIG. 2.

FIG. 4 is a perspective view of an alternate embodiment of the invention wherein the means for temporary attachment is a C-clamp the free end of which is suitable for clamping to any projecting edge or surface of the machine (or support carrying or adjacent to the machine).

FIG. 5 is a perspective view of the same embodiment as is shown in FIG. 4 showing the C-clamp attached to one end of the flexible cable and as the fastening means receiving and retaining device is a generally planar surface, platform or tray for catching any inadvertently dropped manually manipulatable fastening means.

Figure 1:
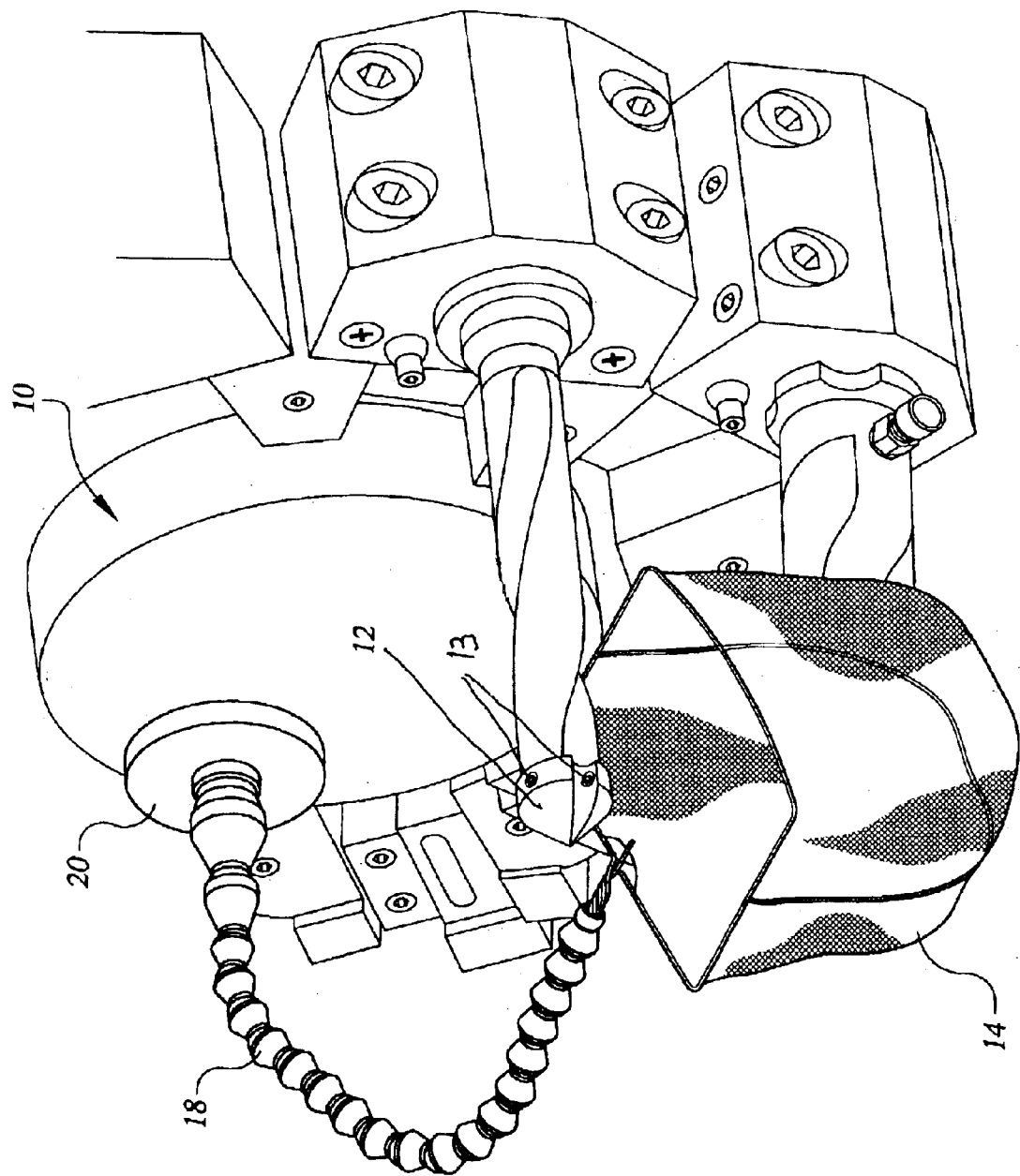

Turning to the drawings in more detail, the machine 10 can be any materials working, forming, drilling, grinding, cutting, etc. machine. These machines are widely known and used, and are familiar to those skilled in this art. The machine 10 has a tool 12 which requires periodic removal for replacement, servicing, sharpening and the like. These tools are also generally known. They are attached by a fastener or fasteners 13 such as a screw or bolt which are loosened using conventional hand tools. However, in the course of removal to complete the removal process, the loosened fastener must be grasped manually with the fingers to prevent its being dropped and possibly lost.

The present invention overcomes this problem.

The fastening means receiving and retaining device is preferably an open pouch 14 or a generally planar tray or platform 16. The pouch 14 can be a netting provided with a rim and is open at the top. The size of the opening or the area of the tray depends on the application and can be varied to suit the situation. The pouch or tray is usually positioned from a few inches to about 12 inches below the tool.

The pouch or tray is supported by a flexible means for connecting 18 which is adapted to be manually positioned and shaped to retain its shape and position in a self sustaining manner while carrying the pouch 14 or tray 16, both when empty, and when carrying a dropped fastener. The flexible means for connecting 18, per se, is a commercially available material. It is made of plastic and can be obtained from Loc-Line Corporation under the name of "Loc-Line Adjustable Coolant Hose System". Essentially the same product can also be obtained from Snap-Lok under the name "SnapLok System".

One end of the means for connecting 18 is attached to pouch 14 or tray 16. The other end terminates in a means for attachment to machine 10 or to an adjacent surface so that pouch 14 or tray 16 is suspended in the air. The means for attachment can be a magnet 20 or a C-clamp 22. The magnet can be used on an iron machine or surface such as an iron work table. The C-clamp 22 is the embodiment of choice for attachment to other surfaces such as wood or non-ferrous metals.

This invention is applicable to a variety of machines such as a lathe or drill.

This invention is also applicable to provide a way of catching and retaining inadvertently dropped nuts and screws under the hood of a motor vehicle or in proximity to a wheel well while changing a tire. Using a magnetic as the means for temporary attachment, the apparatus of this invention can be usefully attached to the fender or firewall of a vehicle. The invention can also be used on a work bench surface in proximity to a machine tool Having fully described the invention, the following claims are intended to particularly point out and distinctly claim the invention.

I claim:

1. A system for facilitating the changing of tools on machines comprising:
    (1) a machine,
    (2) a machine tool operatively connected to said machine by manually manipulatable fastening means,
    (3) a fastening means receiving and retaining device adapted for placement beneath said machine tool for catching and retaining said fastening means when inadvertently dropped,
    (4) means for temporary attachment to said machine or machine adjacent surface, and
    (5) flexible means for connecting said fastening means receiving and retaining device to said means for temporary attachment, said flexible means being adapted to be manually positioned and shaped and to retain its shape and position in a self-sustaining manner while holding said fastening means receiving and retaining device beneath said machine tool.

2. The system of claim 1 wherein the means for temporary attachment is a magnet.

3. The system of claim 1 wherein the means for temporary attachment is a C-clamp.

4. The system of claim 1 wherein the fastening means receiving and retaining device is a flexible pouch.

5. The system of claim 1 wherein the fastening means receiving and retaining device is an inflexible generally planar surface or tray.

6. A structure for facilitating the changing of tools on machines comprising:
    (1) a machine,
    (2) a machine tool operatively connected to said machine by manually manipulatable fastening means,
    (3) a fastening means receiving and retaining device positioned beneath said machine tool for catching and retaining said fastening means when inadvertently dropped,
    (4) means for temporary attachment attached to said machine or machine adjacent surface, and
    (5) flexible means connecting said fastening means receiving and retaining device to said means for temporary attachment, said flexible means being adapted to be manually positioned and shaped and to retain its shape and position in a self-sustaining manner, said flexible means holding said fastening means receiving and retaining device beneath said machine tool.

7. The structure of claim 6 wherein the means for temporary attachment is a magnet.

8. The structure of claim 6 wherein the means for temporary attachment is a C-clamp.

9. The structure of claim 6 wherein the fastening means receiving and retaining device is a flexible pouch.

10. The structure of claim 6 wherein the fastening means receiving and retaining device is an inflexible generally planar surface or tray.

\* \* \* \* \*